United States Patent [19]

Matsuda et al.

[11] 3,884,864
[45] May 20, 1975

[54] PROCESS FOR PREPARATION OF NONFLAMMABLE WATER-CONTAINING POLYMER MATERIAL FROM BASIC SALTS OF POLYMERIZABLE MIXTURES OF ETHYLENICALLY UNSATURATED PHOSPHATES

[75] Inventors: Hideaki Matsuda, Marugame; Fujio Yamauchi, Kanonji; Hisakazu Mori, Kagawa-ken, all of Japan

[73] Assignee: Okura Kogyo Kabushiki Kaisha, Japan

[22] Filed: May 14, 1973

[21] Appl. No.: 360,058

Related U.S. Application Data

[63] Continuation of Ser. No. 117,115, Feb. 19, 1971, abandoned.

[30] Foreign Application Priority Data

Feb. 21, 1970 Japan.............................. 45-14948
Feb. 28, 1970 Japan.............................. 45-17221

[52] U.S. Cl...............260/29.7 NR; 260/29.7 RP; 260/29.7 UA; 260/29.7 W; 260/29.7 WA; 260/29.7 T; 260/80.71; 260/86.1 E; 260/870

[51] Int. Cl......................................... C08g 45/24

[58] Field of Search 260/29.6 NR, 29.6 H, 29.6 WA, 260/29.6 TA, 86.1 E, 80.71, 870, 29.7 NR, 29.7 H, 29.7 T

[56] References Cited
UNITED STATES PATENTS

2,692,876  10/1954  Cupery .......................... 260/29.6 H
2,723,971  11/1955  Cupery .......................... 260/29.6 H
2,854,434  9/1958  Beaman ....................... 260/29.6 NR

*Primary Examiner*—Harold D. Anderson
*Attorney, Agent, or Firm*—Wenderoth, Lind & Ponack

[57] ABSTRACT

Process for preparation of nonflammable water-containing polymer material characterized by adding water to a mixture of A and B or A, B and C wherein A is a basic salt of a polymerizable mixture of phosphates of each of the formulae

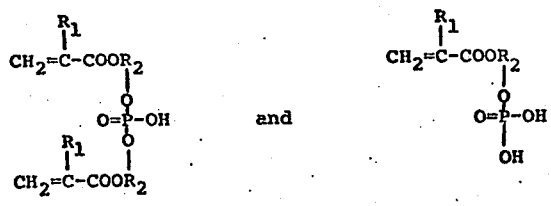

or their partial alkylene oxide addition products, in which $R_1$ is hydrogen or methyl, $R_2$ is an alkylene or halogenated alkylene group, B is a polymerizable monomer and C is an unsaturated polyester, whereby a water-in-oil emulsion is prepared, adding a polymerization catalyst to the emulsion and curing the emulsion.

9 Claims, No Drawings

PROCESS FOR PREPARATION OF NONFLAMMABLE WATER-CONTAINING POLYMER MATERIAL FROM BASIC SALTS OF POLYMERIZABLE MIXTURES OF ETHYLENICALLY UNSATURATED PHOSPHATES

This is a continuation of application Ser. No. 117,115, filed Feb. 19, 1971, now abandoned.

The present invention relates to a process for the preparation of a phosphorus cured substance containing water, and more particularly to a process for the preparation of a novel watercontaining cured substance useful as nonflammable polymer material. Such process is characterized by adding water to a mixture of A and B or A, B and C, the water optionally containing a small quantity of a hydrophilic high molecular compound such as polyvinyl alcohol or polyethylene glycol, to prepare a water-in-oil emulsion, adding a polymerization catalyst to the emulsion and curing the emulsion. The substance A is a basic salt of a polymerizable mixture of phosphates represented by the following formulae, or their partial alkylene oxide addition products:

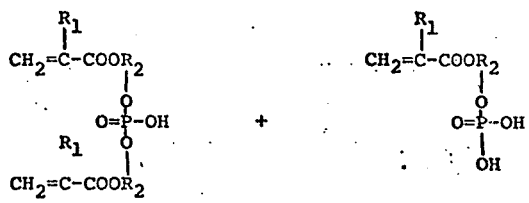

in which $R_1$ denotes hydrogen or a methyl group, $R_2$ denotes an alkylene group such as ethylene or propylene, or a halogenated alkylene group, such as chloropropylene, B represents a polymerizable monomer, and C represents an unsaturated polyester.

The inventors have been engaged in research on curable substances containing phosphorus for a long period of time, devoting particular attention to the polymerizable mixture of phoshates represented above. This polymerizable mixture of phosphates can be manufactured advantageously on an industrial scale by reacting an acrylate or methacrylate containing a hydroxyl group as represented by the formula

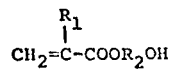

in which $R_1$ and $R_2$ are as defined above, with phosphorus pentoxide in accordance with a per se conventional process.

The inventors have found that when water is added to a mixture of (A) the salt obtained by neutralizing the unreacted phosphoric acid group in the polymerizable mixture of phosphates, or its partial alkylene oxide addition product, with a base such as polyamine, (B) a polymerizable monomer and, optionally, (C) an unsaturated polyester, a water-in-oil emulsion is formed, which when cured after addition of a polymerization catalyst, results in a cured substance containing the water which was present in the mixture prior to curing.

The preferred phosphates constituting the polymerizable mixture of phosphates are those of the foregoing formulae wherein $R_2$ is a lower alkylene or halogenated lower alkylene group.

In order to prepare the mixture of the salt and polymerizable monomer, the following process may be employed.

Namely, the polymerizable mixture of phosphates or partial alkylene oxide addition product thereof is previously mixed and dissolved and a fixed quantity of salt generating agent, i.e. a basic substance, for example, polyamine, sufficient to effect a neutralizing reaction is added. In this case, if desired, the polymerizable monomer can act as the solvent, and also at the time of hardening can be used as one component of the curable composition, and therefore is extremely useful.

As the partial alkylene oxide addition product of the polymerizable mixture of phosphates, it is preferable to add an alkylene oxide to the mixture so as to react with the unreacted phosphate groups to such a degree that up to one-half of the initial acid value is reduced. The alkylene oxide to be employed may be exemplified by ethylene oxide, propylene oxide, butylene oxide, epichlorohydrin, epibromohydrin and the like. They may be used singly or in admixture with each other. In order to improve the nonflammable property of the cured composition, a compound such as epichlorohydrin containing halogen is preferred.

As the polymerizable monomer to be used in the present invention, styrene, methylmethacrylate, ethylacrylate, butylacrylate, hydroxyethyl methacrylate, $\beta$-hydroxy-chloropropylmethacrylate and divinyl benzene are illustrative. They may be used singly or in admixture with each other.

The quantity of polymerizable monomer (B) to be used in the mixture of A and B is not particularly limited, but it is preferably employed at a 0.5:1 to 2.0:1 ratio by weight based on the salt (A). Also, in the mixture A, B and C, the mixing ratio of each component in the mixture, although not particularly limited, is preferably set at 0.5:1 to 3.0:1 by weight for the total quantity of unsaturated polyester (C) and polymerizable monomer (B) based on the salt (A). Finally, the quantitative relationship between the polymerizable monomer and unsaturated polyester is entirely optional, although the preferred ratio is 4:1 to 1:1 based on the unsaturated polyester (C).

As the salt generating agent to be employed for the preparation of the salt, namely, the basic substance, ethylene diamine, trimethylene diamine, tetramethylene diamine, diethylene triamine, triethylene tetramine, tetraethylene pentamine, pentaethylene hexamine, benzidine, phenylene diamine and other secondary and tertiary polyamines, sodium hydroxide, sodium carbonate, potassium hydroxide, potassium carbonate, magnesium hydroxide, magnesium oxide, calcium oxide, zinc oxide and zinc hydroxide are enumerated as examples. It is preferable to employ a polyamine.

In the present invention, the mixture of the polymerizable salt and polymerizable monomer or the mixture which has been prepared by adding an unsaturated polyester to the latter mixture is mixed with water to prepare a water-in-oil emulsion, although this process may be performed by adding a suitable quantity of water while agitating the mixture violently or by violently agitating the mixture after adding a fixed quantity of water.

The quantity of water to be added to the mixture is preferably set at 10 to 200% based on the total weight of the mixture (A+B or A+B+C), 20–100% being more preferable. Also, the water may optionally contain a small quantity of a hydrophilic high molecular compound such as polyvinyl alcohol or polyethylene glycol.

As described in the foregoing, the emulsion can be prepared by adding the fixed quantity of the salt generating agent to the quantity of water to be added and then adding this mixture to the mixture of the polymerizable phosphates, or its partial alkylene oxide addition addition product, and the polymerizable monomer. The polymerization catalyst is then added to the curable emulsion obtained by this process to effect the hardening reaction. This hardening reaction takes place easily at room temperature or high temperatures, but in order to accelerate the hardening rate, it is preferable to apply a high temperature, e.g. 50°–80°C. As the polymerization catalyst, benzoyl peroxide, azobis isobutylonitrile (A.I.B.N.) potassium persulfate, ammonium persulfate, hydrogen peroxide and soda perborate are illustrative.

Furthermore, in the hardening process of the curable emulsion, inorganic substances such as calcium carbonate, calcium sulfate, silica, talc, diatom earth and perlite may be added. Also, in order to intensify the strength of the hardening substance, glass fiber, asbestos fiber, rock wool and the like may be added.

The cured substance obtained by the foregoing process is a novel substance which contains water, initially contained in the mixture prior to hardening. This is the solid cured substance which is generally insoluble and infusible. The resin layer in the cured substance is regarded as forming the net working by both bonds, i.e. covalent and ionic bonds. This water-containing cured substance exhibits a low temperature rising effect due to the evaporation heat of the water contained in the cured substance, even if the surface is heated by exposing it to a flame. Additionally, the resin component is only a slowly carbonizing component. When the flame is removed, the component is immediately extinguished automatically. Although the water in the cured substance is eliminated by evaporation, since the resin component originally contained phosphorus which makes it nonflammable, the cured substance never becomes flammable. Also, since the cured substance contains water, it is possible to manufacture a greater quantity of this product based on a fixed amount of materials A, B and/or C, and therefore its sale may be at a relatively low price and extremely economical.

The water-containing cured substance obtained by the present invention is very useful in many areas such as a nonflammable polymer material, moulding material, paving material, heat insulating material and the like.

The present invention will be understood by the foregoing description in conjunction with the Examples which follow. Examples 1–6 illustrate mixtures of A and B, while Examples 7–12 illustrate mixtures of A, B and C. Parts and percentages are by weight unless specified otherwise.

EXAMPLE 1

80 parts of water were added to an agitated mixture consisting of 50 parts of a salt and 50 parts of methylmethacrylate, the salt having been obtained by neutralizing the unreacted phosphate groups of a polymerizable mixture of phosphates (acid value 242) with triethylenetetramine. The mixture of phosphates were prepared by reaction of β-hydroxychloropropyl methacrylate and phosphorus pentoxide. Thus, a water-in-oil emulsion was prepared. Thereafter, 0.3% of potassium persulfate, 0.2% of benzoyl peroxide (B.P.O.) and, as accelerator, 0.15% by weight of N,N-dimethylaniline were added to the emulsion, and the resultant mixture was kept for 1 hour at 60°C whereby a cured substance containing water initially contained in the mixture prior to the hardening process was prepared. This water-containing cured substance has a low temperature rising property due to the evaporation heat of the water contained therein even if the surface is heated by exposing it to a flame; the resin component was only slowly carbonized. When the flame was removed, the cured substance was immediately extinguished automatically.

EXAMPLE 2

70 parts of water were added to an agitated mixture consisting of 50 parts of a salt, 30 parts of methylmethacrylate and 20 parts of styrene, the salt being obtained by neutralizing the unreacted phosphate groups of a polymerizable mixture of phosphates (acid value 311) with tetraethylenepentamine. The mixture of phosphates were prepared by the reaction of hydroxyethyl methacrylate and phosphorus pentoxide. Thus, a water-in-oil emulsion was prepared. Thereafter, 0.2% potassium persulfate, 0.3% B.P.O. and 0.1% N,N-diamethylaniline were added to the emulsion and the resultant mixture was kept at 50°C for 1.5 hour and at 60°C for 5 hours whereby a cured substance containing water initially contained in the mixture prior to the hardening process was obtained. This water-containing cured substance was such that the resin component was only slowly carbonizing, even if it was heated by exposing the surface to a flame. When the flame was removed, the cured substance was immediately and automatically extinguished.

EXAMPLE 3

50 parts of water were added to an agitated mixture consisting of 50 parts of a salt, 30 parts of methylmethacrylate, 10 parts of hydroxyethyl methacrylate and 10 parts of styrene, the salt having been prepared by neutralizing unreacted phosphate groups of a polymerizable mixture of phosphates (acid value 242) with diethylenetriamine. The mixture of phosphates was obtained by the reaction of β-hydroxychloropropyl methacrylate and phosphorus pentoxide. Thus, a water-in-oil emulsion was prepared. Thereafter, 0.3% potassium persulfate, 0.3% B.P.O. and 0.1% N,N-dimethylaniline were added to the emulsion, and the mixture was kept at 50°C for 1 hour and at 65°C for 5 hours, whereby a cured substance containing water initially contained in the mixture prior to the hardening process was obtained. This water-containing cured substance possessed the same fire-resistant properties as in Examples 1 and 2.

EXAMPLE 4

40 parts of water were added to an agitated mixture consisting of 60 parts of salt, 30 parts of methylmethacrylate, and 10 parts of styrene, the salt having been prepared by neutralizing unreacted phosphate groups of a partial epichlorohydrin addition product of a polymerizable mixture of phosphates with triethylene tetramine. The mixture of phosphates had been obtained by reacting β-hydroxychloropropyl methacrylate and phosphorus pentoxide (the addition of epichlorohydrin to unreacted phosphate groups in the mixture of phosphates was such that one-third of the initial acid value was reduced to an acid value of 136). Thus, a water-in-oil emulsion was prepared. Thereafter, 0.3% potassium persulfate, 0.3% B.P.O. and 0.1% N,N-dimethylaniline were added and the mixture was kept at 60°C for 1 hour and at 70°C for 5 hours whereby a cured substance containing water initially contained in the mixture prior to the hardening process was obtained. This water-containing cured substance possessed the same fire-resistant properties as in the previous examples.

EXAMPLE 5

80 parts of water were added to an agitated mixture consisting of 50 parts of the magnesium salt of a polymerizable mixture of phosphates and 50 parts of methylmethacrylate, the mixture of phosphates having been obtained by reaction of β-hydroxychloropropyl methacrylate and phosphorus pentoxide, whereby a water-in-oil emulsion was prepared. Thereafter 0.5% potassium persulfate and 0.1% N,N-dimethylaniline were added, and the mixture was kept at 55°C for 1 hour and at 65°C for 5 hours, whereby a cured substance containing water initially contained in the mixture prior to the hardening process was prepared. This water-containing cured substance possessed the same fire-resistant properties as in the previous examples.

EXAMPLE 6

100 parts of water containing 5% by weight of polyvinyl alcohol was added to an agitated mixture consisting of 50 parts of a salt, 40 parts of methylmethacrylate and 10 parts of styrene, the salt having been prepared by neutralizing unreacted phosphate groups of a polymerizable mixture of phosphates (acid value 311) with triethylenetetramine. The mixture of phosphates were obtained by reaction of hydroxyethyl methacrylate and phosphorus pentoxide. Thus, a water-in-oil emulsion was prepared. Thereafter, 0.5% potassium persulfate and 0.1% N,N-dimethylaniline were added to the emulsion and the resultant mixture was kept at 60°C for 1 hour and at 70°C for 5 hours whereby a cured substance containing water initially contained in the mixture prior to the hardening process was obtained. This water-containing cured substance possessed the same fire-resistant properties as in the previous examples.

EXAMPLE 7

150 parts of water were added to an agitated mixture consisting of 100 parts of a salt, 50 parts unsaturated polyester which was manufactured by polyesterification of 2 mols maleic anhydride, 1 mols phthalic anhydride and 3 mols propylene glycol, 30 parts styrene, and 40 parts methylmethacrylate, the salt having been prepared by neutralizing unreacted phosphate groups of a polymerizable mixture of phosphates (acid value 242) with triethylene tetramine. The mixture of phosphates had been obtained by the reaction of β-hydroxychloro propylmethacrylate and phosphorus pentoxide. The mixture was sufficiently agitated whereby the emulsion was prepared. Thereafter, 0.4% potassium persulfate, 0.2% B.P.O. and 0.1% N,N-dimethylaniline were added to the emulsion and the mixture was kept at 50°C for 1 hour and at 65°C for 5 hours whereby a cured substance containing water initially contained in the mixture prior to the hardening process was obtained. This water-containing cured substance possessed low temperature rising properties due to the evaporation heat of the water even if the surface was heated by exposing it to a flame, and the resin component was only slowly carbonizing. When the flame was removed, it was immediately automatically extinguished.

EXAMPLE 8

200 parts water were added to an agitated mixture consisting of 100 parts of a salt, 100 parts of the same unsaturated polyester as employed in Example 7, 60 parts styrene and 40 parts β-hydroxychloropropyl methacrylate, the salt having been obtained by neutralizing unreacted phosphate groups of a polymerizable mixture of phosphates with diethylenetriamine. The mixture of phosphates was prepared by the reaction of β-hydroxychloropropyl methacrylate with phosphorus pentoxide. Thus, a water-in-oil emulsion was prepared. 0.3% potassium persulfate, 0.3% B.P.O. and 0.1% N,N-dimethylaniline were added to the emulsion and the mixture was kept at 50°C for 1 hour, and at 65°C for 5 hours whereby a cured substance containing water initially contained in the mixture prior to the hardening process was obtained. This water-containing cured substance possessed the same fire-resistant properties as in the previous examples.

EXAMPLE 9

180 parts water were added to an agitated mixture consisting of 100 parts of a salt, 40 parts of the same unsaturated polyester as employed in Example 7, 30 parts styrene and 100 parts methylmethacrylate, the salt having been prepared by neutralizing unreacted phosphate groups of a polymerizable mixture of phosphates (acid value 311) with tetraethylenepentamine. The mixture of phosphates had been prepared by the reaction of hydroxyethyl methacrylate and phosphorus pentoxide. Thus, a water-in-oil emulsion was prepared. Thereafter, 0.3% potassium persulfate, 0.2% B.P.O. and 0.1% N,N-dimethylaniline were added to the emulsion and the mixture was kept at 50°C for 1 hour and at 65°C for 5 hours whereby a cured substance containing water initially contained in the mixture prior to the hardening process was obtained. This water-containing cured substance possessed the same fire-resistant properties as in the previous examples.

EXAMPLE 10

85 parts water were added to an agitated mixture consisting of 100 parts of a salt, 50 parts of the same unsaturated polyester as employed in Example 7, and 50 parts styrene, the salt having been obtained by neutralizing unreacted phosphate groups of a partial epichlorohydrin addition product (i.e. epichlorohydrin was added to the unreacted phosphate groups in a mixture of phosphates to such an extent that one-third of the initial acid value of the phosphates was reduced to an acid value of 136) of a polymerizable mixture of phosphate with triethylene tetramine.

The mixture of phosphates was prepared by the reaction of β-hydroxychloropropyl methacrylate and phosphorus pentoxide. Thus, a water-in-oil emulsion was prepared. 0.3% potassium persulfate, 0.3% B.P.O. and 0.1% N,N-dimethylaniline were added to the emulsion and the mixture was kept at 60°C for 1 hour, and at 70°C for 5 hours whereby a cured substance containing water initially contained in the mixture prior to the hardening process was obtained. This water-containing cured substance possessed the same fire-resistant properties as in the previous examples.

EXAMPLE 11

180 parts water were added to an agitated mixture consisting of 40 parts of the same unsaturated polyester as employed in Example 7, 30 parts styrene, 60 parts methylmethacrylate and 100 parts of a magnesium salt of a polymerizable mixture of phosphates which had been obtained by the reaction of β-hydroxychloropropylmethacrylate and phosphorus pentoxide. Thus, a water-in-oil emulsion was prepared. 0.5% potassium persulfate and 0.1% N,N-dimethylaniline were added to the emulsion and the mixture was kept at 50°C for 1 hour and at 60°C for 5 hours whereby a cured substance containing water initially contained in the mixture prior to the hardening process was prepared. This cured substance possessed the same fire-resistant properties as in the previous examples.

EXAMPLE 12

220 parts water containing 5% polyvinyl alcohol were added to an agitated mixture consisting of 100 parts of a salt, 50 parts of the same unsaturated polyester as employed in Example 9, 30 parts styrene and 40 parts methylmethacrylate, the salt having been prepared by neutralizing unreacted phosphate groups of a polymerizable mixture of phosphates with triethylene tetramine.

The mixture of phosphates was prepared by the reaction of hydroxyethylmethacrylate and phosphorus pentoxide. Thus, a waterin-oil emulsion was prepared. 0.2% potassium persulfate, 0.3% B.P.O. and 0.1% N,N-dimethylaniline were added to the emulsion and the mixture was kept at 50°C for 1 hour and at 60°C for 5 hours whereby a cured substance containing water initially contained in the mixture prior to the hardening process was obtained. This water-containing cured substance possessed the same fire-resistant properties as in the previous examples.

We claim:

1. A process for preparing a non-flammable, resinous water-containing cured composition which is insoluble and infusible, which comprises adding water to a mixture of A and B or A, B and C, wherein A is a basic salt of a polymerizable mixture of phosphates containing at least one compound from each of the formulae

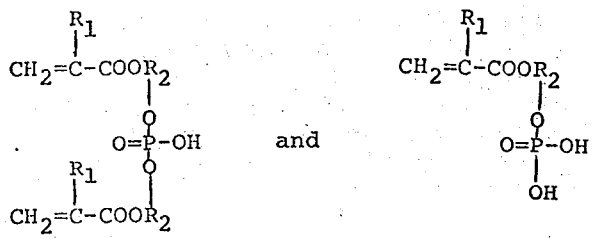

or partial alkylene oxide addition products of said compounds having an acid value of at least one-half the initial acid value of the mixture of phosphates, wherein $R_1$ is hydrogen or methyl and $R_2$ is a lower alkylene or halogenated lower alkylene group, B is a polymerizable ethylenically unsaturated monomer and C is an unsaturated polyester obtained by reacting the components of a mixture containing propylene glycol and maleic anhydride, to obtain a water-in-oil emulsion, adding a polymerization catalyst selected from the group consisting of benzoyl peroxide, azobis isobutylonitrile, potassium persulfate, ammonium persulfate, hydrogen peroxide and soda perborate to the emulsion and curing the resultant mixture at from room temperature to 80°C, the quantity of water being 10–200% by weight based on the weight of the A and B mixture or the A, B and C mixture, the weight ratio of B to A in the A and B mixture being from 0.5:1 to 2.0:1, the weight ratio of B+C to A and of B to C in the A, B and C mixture being from 0.5:1 to 3.0:1 and from 4:1 to 1:1, respectively.

2. The process according to claim 1, wherein $R_2$ is ethylene, propylene or chloropropylene.

3. The process according to claim 1, wherein the water to be added to the mixture of A and B or A, B and C contains polyvinyl alcohol or polyethylene glycol.

4. The process according to claim 1, wherein the basic salt is formed utilizing a polyamine, an alkali metal hydroxide, oxide or carbonate, or an alkaline earth metal hydroxide, oxide or carbonate.

5. The process according to claim 4, wherein the basic salt is formed utilizing a lower alkylene polyamine.

6. The process according to claim 1, wherein the alkylene oxide is a lower alkylene oxide, epichlorohydrin or epibromohydrin.

7. The process according to claim 1, wherein the polymerizable monomer is at least one member selected from the group consisting of styrene, methylmethacrylate, ethylacrylate, butylacrylate, hydroxyethylmethacrylate, β-hydroxy-chloropropylmethacrylate and divinyl benzene.

8. The process according to claim 1, wherein the water is added to a mixture of A and B.

9. The process according to claim 1, wherein the water is added to a mixture of A, B and C.

* * * * *